(12) United States Patent
Higuchi

(10) Patent No.: US 11,622,050 B2
(45) Date of Patent: Apr. 4, 2023

(54) IMAGE FORMING APPARATUS

(71) Applicant: Seiko Epson Corporation, Tokyo (JP)

(72) Inventor: Tomoyuki Higuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/381,726

(22) Filed: Jul. 21, 2021

(65) Prior Publication Data

US 2022/0030123 A1  Jan. 27, 2022

(30) Foreign Application Priority Data

Jul. 23, 2020 (JP) .............................. JP2020-125896

(51) Int. Cl.
*G06F 3/12* (2006.01)
*H04N 1/00* (2006.01)
*G06K 15/10* (2006.01)

(52) U.S. Cl.
CPC ....... *H04N 1/00384* (2013.01); *H04N 1/0049* (2013.01); *H04N 1/00411* (2013.01); *H04N 1/00496* (2013.01); *H04N 1/00551* (2013.01); *H04N 1/00633* (2013.01); *H04N 1/00888* (2013.01); *G06K 15/102* (2013.01); *H04N 2201/0094* (2013.01)

(58) Field of Classification Search
CPC ........... H04N 1/00384; H04N 1/00411; H04N 1/0049; H04N 1/00493; H04N 1/00496; H04N 1/00551; H04N 1/00633; H04N 1/00888; H04N 2201/0094; G06K 15/102
See application file for complete search history.

(56) References Cited

U.S. PATENT DOCUMENTS

| | | | | |
|---|---|---|---|---|
| 2008/0286002 A1* | 11/2008 | Akiyama | ........... | G03G 21/1633 399/114 |
| 2011/0199638 A1 | 8/2011 | Ogino et al. | | |
| 2013/0321840 A1* | 12/2013 | Yamamoto | ......... | H04N 1/00482 358/1.13 |
| 2015/0138284 A1* | 5/2015 | Nagashima | .......... | C09D 175/04 347/86 |
| 2017/0111526 A1* | 4/2017 | Nakamura | ......... | H04N 1/00551 |
| 2022/0030123 A1* | 1/2022 | Higuchi | ............... | G06K 15/005 |

FOREIGN PATENT DOCUMENTS

JP  2011-170070  9/2011

* cited by examiner

*Primary Examiner* — Moustapha Diaby
(74) *Attorney, Agent, or Firm* — Workman Nydegger

(57) ABSTRACT

An image forming apparatus reads a document mounted on a document positioning section by using an image reading section, and forms an image of the document on a sheet by using an image forming section. The sheet subjected to the image formation processing is mounted on a discharge tray via a discharge section. The image forming apparatus includes an operation unit that has a touch panel and that protrudes from a front portion of the image reading section, and a power button that is a hardware button provided on a back side of the operation unit and on a front portion of the image reading section.

19 Claims, 6 Drawing Sheets

IMAGE FORMING APPARATUS

The present application is based on, and claims priority from JP Application Serial Number 2020-125896, filed Jul. 23, 2020, the disclosure of which is hereby incorporated by reference herein in its entirety.

BACKGROUND

1. Technical Field

The present disclosure relates to an image forming apparatus.

2. Related Art

Known image forming apparatuses have functions of a copying machine, a printer, an image scanner, and the like. Such image forming apparatuses have operation buttons used to operate the functions and an operation unit that includes operation buttons.

For example, an image forming apparatus in JP-A-2011-170070 includes a rectangular operation unit disposed on the front of an image reading section. On the operation unit, in addition to a touch panel display, a plurality of hardware buttons such as a power button, a power-saving button, and numeric-keypad buttons are provided.

In such an image forming apparatus in JP-A-2011-170070, however, the variety of operation buttons including the power button on the single operation unit may make it difficult for the user to identify the important power button due to the other operation buttons. For example, in the course of operation of the touch panel display, the numeric-keypad buttons, and other buttons, the user may unintentionally and erroneously operate the power button. The operation of the power button causes the image forming apparatus to shut down or reboot, which wastes time and is inconvenient for the user.

SUMMARY

According to an aspect of the present disclosure, an image forming apparatus includes an image reading section configured to read a document mounted on a document positioning section, a document pressing cover configured to be opened or closed, the pressing cover being disposed on the image reading section, an image forming section configured to form an image on a sheet, a discharge section configured to discharge the sheet on which the image is formed by the image forming section, a discharge tray configured to receive the sheet from the discharge section, and an operation unit including at least a touch panel display, in which a power button that is a hardware button is provided a back side of the operation unit and on a front portion of the image reading section

DESCRIPTION OF EXEMPLARY EMBODIMENTS

First Embodiment

Overview of Image Forming Apparatus

Figure 1:
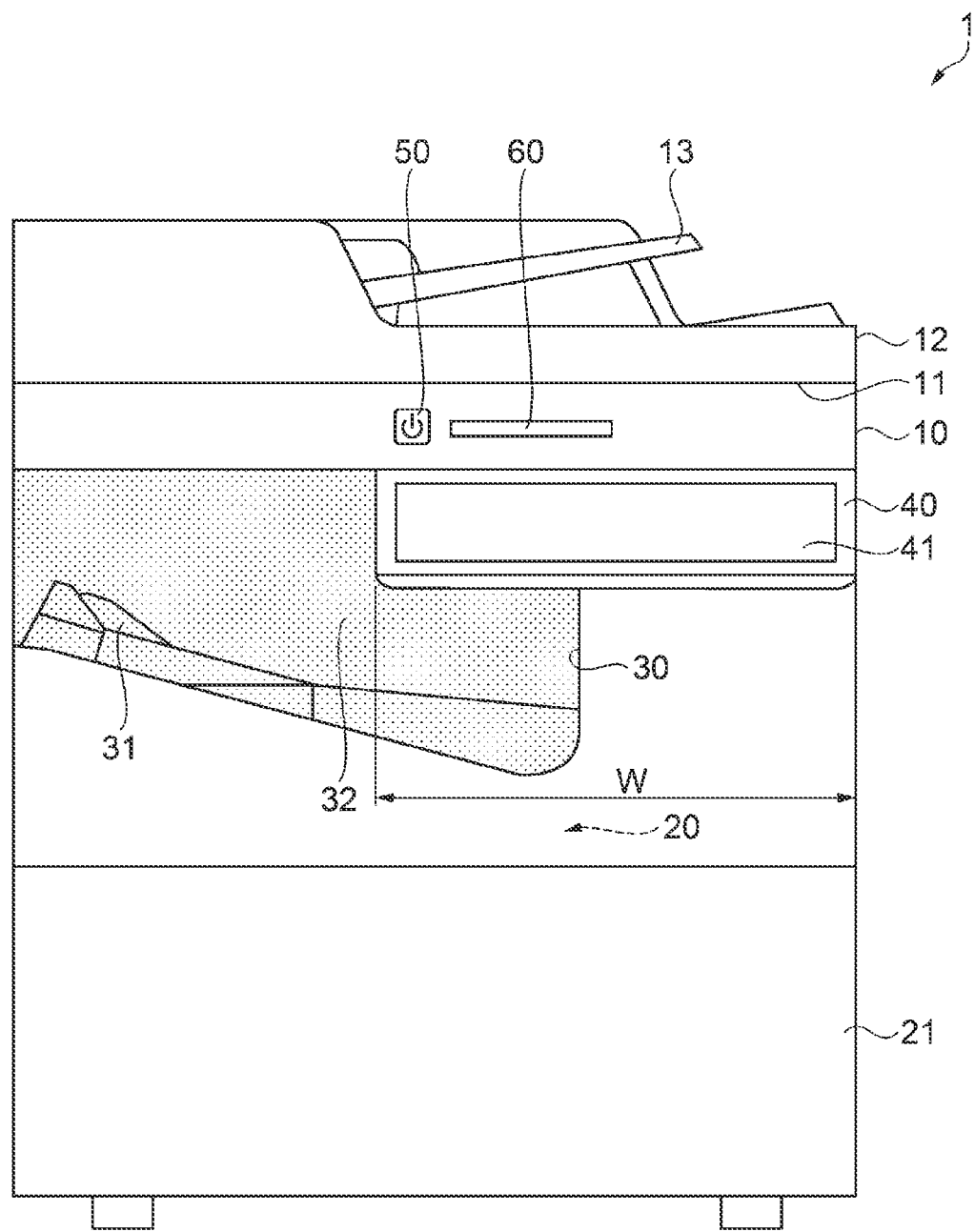
FIG. 1 is a front view illustrating an image forming apparatus according to a first embodiment.

FIG. 1 is a front view illustrating an image forming apparatus. An image forming apparatus 1 according to the embodiment is a multifunction peripheral (MFP) that has a printer function, a copy function, a scanner function, a facsimile function, and the like. In this embodiment, the image forming apparatus 1 is coupled to a local area network (LAN). The image forming apparatus 1 prints image data that is transmitted from a terminal device such as a personal computer coupled to the LAN. The image forming apparatus 1 may have wireless communication functionality such as wireless LAN and Bluetooth (registered trademark).

The image forming apparatus 1 in front view has a substantially rectangular shape as illustrated in FIG. 1. In FIG. 1, a width direction of the image forming apparatus 1 is referred to as an X-axis direction, a height direction is referred to as a Y-axis direction, and a depth direction is referred to as a Z-axis direction. A tip of an arrow of the X-axis denotes a right side, a base end of the arrow of the X-axis denotes a left side, a tip of an arrow of the Y-axis denotes an upper side, and a base end of the arrow of the Y-axis denotes a lower side. The same applies to the other drawings. When the user operates the image forming apparatus 1, the user faces the image forming apparatus 1 in FIG. 1 and operates an operation unit 40.

The image forming apparatus 1 includes an image reading section 10, an image forming section 20, a discharge section 30, and the operation unit 40.

Image Reading Section

The image reading section 10 is a flatbed scanner and includes a document positioning section 11. The image reading section 10 has a function of reading a document mounted on the document positioning section 11. The document positioning section 11 includes, as an upper surface, a document positioning plate (not illustrated) that includes a transparent resin plate-shaped member. The document positioning plate may be any transparent plate, such as a glass plate. The document positioning plate is covered with a document pressing cover 12 in a normal state and is exposed when the document pressing cover 12 is opened such that a document can be set. The document positioning section 11 includes a light source and a scanner unit that has a line sensor (not illustrated).

A portion of the document pressing cover 12 close to the user is freely openable and closable about an end in the depth direction. In other words, the document pressing cover 12 is opened or closed on the image reading section 10. For an image to be read, in a state in which a document is mounted on the document positioning plate, the document pressing cover 12 is closed. An automatic document feeder 13 that can automatically feed documents that have been set is provided in an upper portion of the document pressing cover 12.

Image Forming Section

A sheet cassette 21 is provided in a lower portion of the image forming apparatus 1, and the image forming section 20 is disposed on the sheet cassette 21 as illustrated in FIG. 1. The sheet cassette 21 is a sheet storage section that includes a plurality of cassettes that correspond to paper sizes. A transport section (not illustrated) is disposed between the sheet cassette 21 and the image forming section 20, and the transport section picks up sheets one by one from a selected cassette and transports the sheets to the image forming section 20. The image forming section 20 is disposed inside the image forming apparatus 1 and includes a print unit (not illustrated). In this embodiment, the print unit includes a line-type ink jet head. The print unit is a single-pass print unit and forms an image through one-pass processing on a transported sheet. The image forming section 20 can also form an image that is read by the image reading section 10 on a sheet.

Discharge Section

The discharge section 30 is a transport section that discharges a sheet subjected to the image forming processing in the image forming section 20 toward an internal discharge section 32. The discharged sheet is mounted on a discharge tray 31 in the internal discharge section 32.

Internal Discharge Section

The internal discharge section 32 is a space in a housing that is defined between the image reading section 10 and the image forming section 20 in an up-down direction. The discharge tray 31 is disposed in the internal discharge section 32. The internal discharge section 32 is surrounded by the discharge section 30 on the right side, by the discharge tray 31 on the bottom, and by the document positioning section 11 on the top. The internal discharge section 32 is a space that has an opening on a front portion of the image forming apparatus 1. The internal discharge section 32 is a space in which a plurality of sheets discharged from the discharge section 30 are mounted. Wall surface members of the inside of the internal discharge section 32 denoted by the dotted portion in FIG. 1 are a dark color. In this embodiment, the wall surface members are black. It should be noted that black is an example dark color, and the color may be, for example, a 256-level grayscale color in a range of 0 to 20. In the description below, similarly, with respect to other components, simply stating black means a color that has a similar tonal value. In addition, for example, the color may be dark blue or dark green. In this embodiment, the color tone of the housing of the image forming apparatus 1 is ivory, and may be a light color such as light gray or light blue.

Operation Unit

The operation unit 40 includes at least a touch panel 41 as illustrated in FIG. 1. The touch panel 41 will be described below. The operation unit 40 is a rectangular plate-shaped member and has long sides that extend in the X-axis direction. The dimension of the long side is referred to as a width W.

Figure 2:
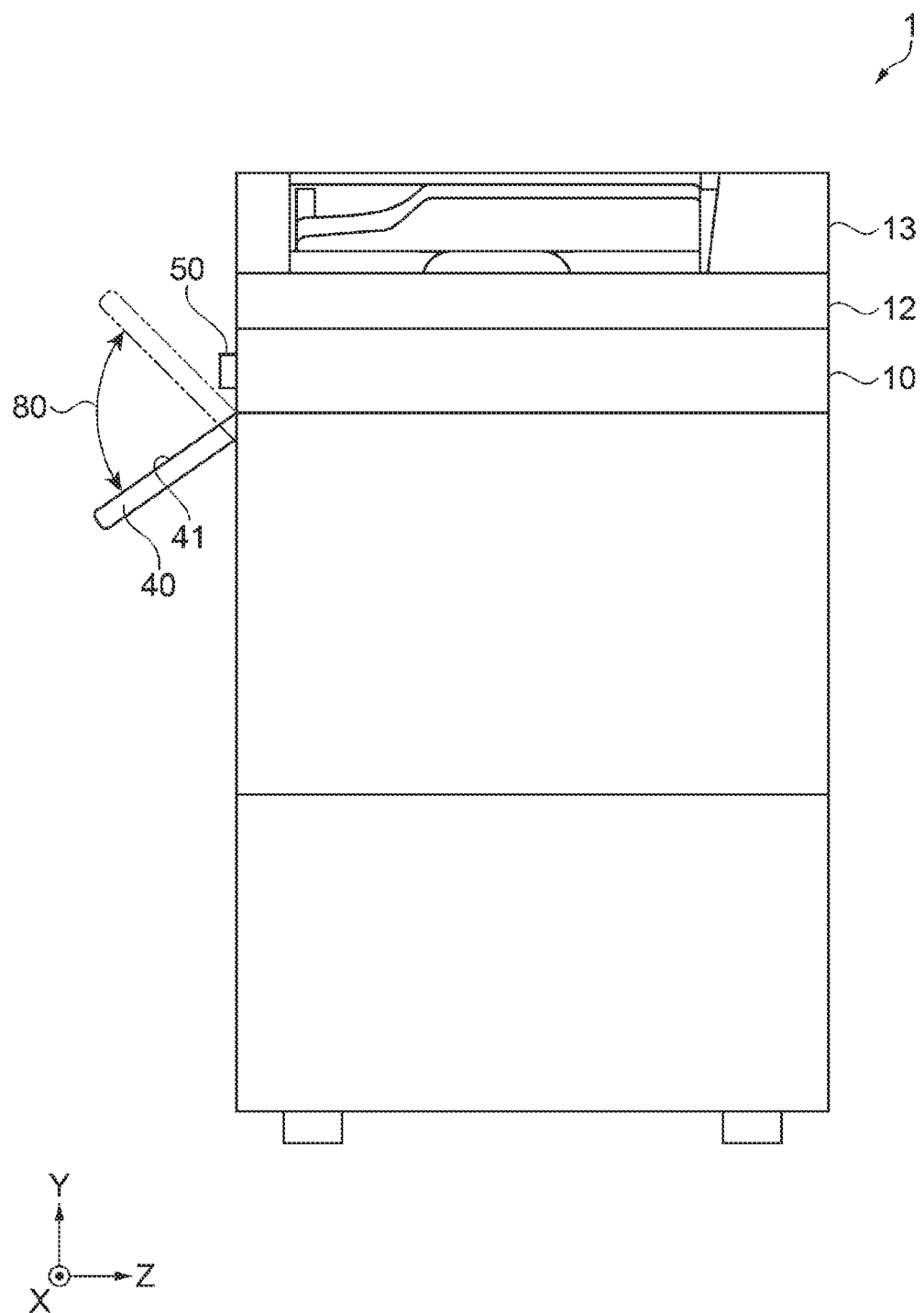
FIG. 2 is a right side view illustrating an image forming apparatus.

FIG. 2 is a right side view illustrating the image forming apparatus. As illustrated in FIG. 2, the operation unit 40 protrudes from a front portion of the image reading section 10. More specifically, an end of the touch panel 41 on the protruding side is tilted toward the lower side of the image forming apparatus 1. This structure increases visibility for the user facing the image forming apparatus 1. The operation unit 40 is tiltable, and more specifically, as indicated by arrow 80 in FIG. 2, the angle from the apparatus front toward the rear can be adjusted about the end of the image reading section 10 serving as a pivot. In this embodiment, the inclination can be adjusted within a range of approximately 100 degrees.

Figure 3:
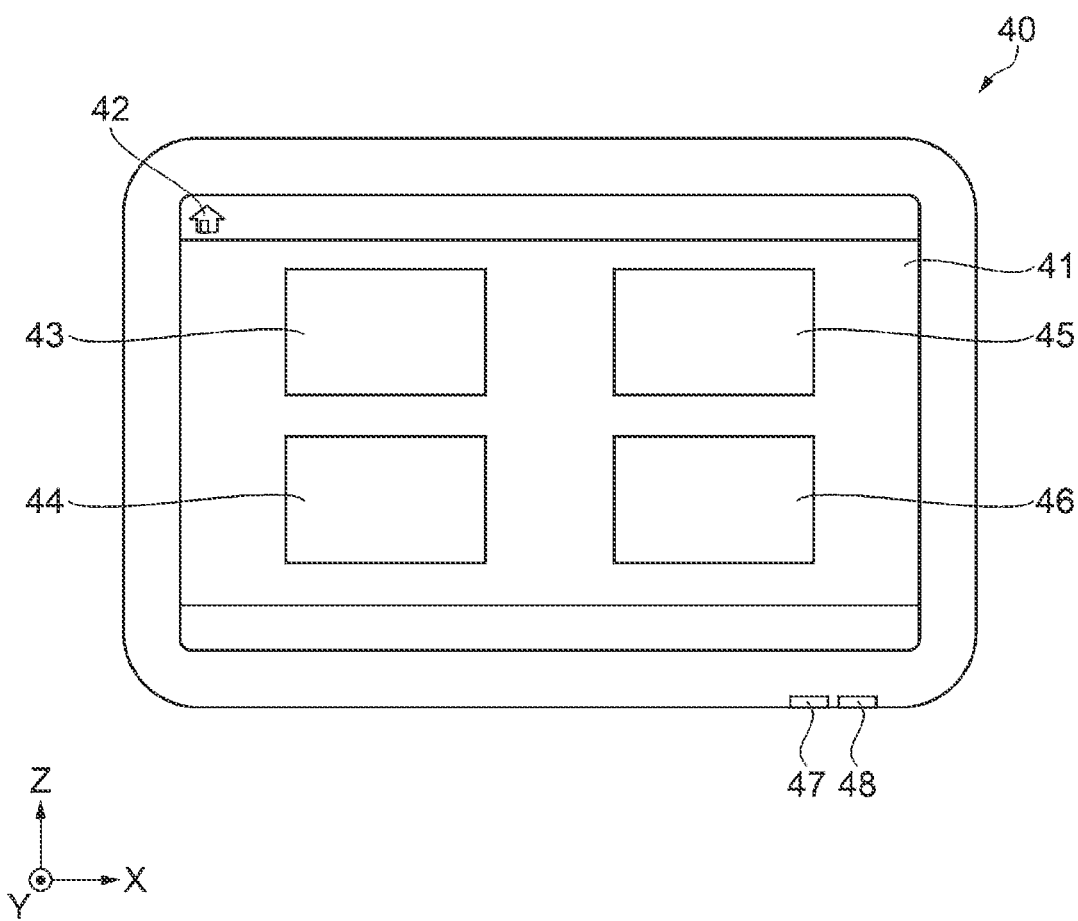
FIG. 3 is a plan view illustrating an operation unit.

FIG. 3 is a plan view illustrating the operation unit. As illustrated in FIG. 3, the operation unit 40 includes the touch panel 41, a light-emitting diode (LED) 47, and an LED 48. The touch panel 41 is a touch panel display and, in this embodiment, a capacitive touch panel. FIG. 3 illustrates a screen on the touch panel 41 that displays, for example, a home button 42 and four software buttons. The home button 42 is always displayed in the upper left of the screen during operation. Operation of the home button 42 causes an initial screen to be displayed. The four software buttons include a printer button 43, a copy button 44, a scanner button 45, and a facsimile button 46.

For example, touching the copy button 44 causes the display screen to switch to a full-screen display for copy function settings. The setting screen may be, for example, a screen for selecting monochrome printing or color printing, a screen for setting the number of copies, or a screen for setting an enlargement or reduction percentage. When any of the other software buttons are operated, similarly, a setting screen for the corresponding function is displayed.

The LEDs 47 and 48 are disposed at the right of the protruding end of the touch panel 41. Each of the LEDs 47 and 48 is an indicator that indicates an operation status of the image forming apparatus 1 by a lighting state. For example, the LED 47 when green denotes a normal state, and the LED 47 when red denotes an abnormal state. The LED 48 when blinking orange denotes a normal transmission state of communication data, and the LED 48 when orange denotes a communication error or a sheet jam. It should be noted that two or more LEDs may be provided.

Returning to FIG. 1, in the front view of the image forming apparatus 1, the internal discharge section 32 is on the left and the operation unit 40 is on the right. At least part of the operation unit 40 overlaps part of the internal discharge section 32. In this embodiment, a little less than half of the width W in the operation unit 40 overlaps the internal discharge section 32.

Power Button and Identification Bar

Figure 4:
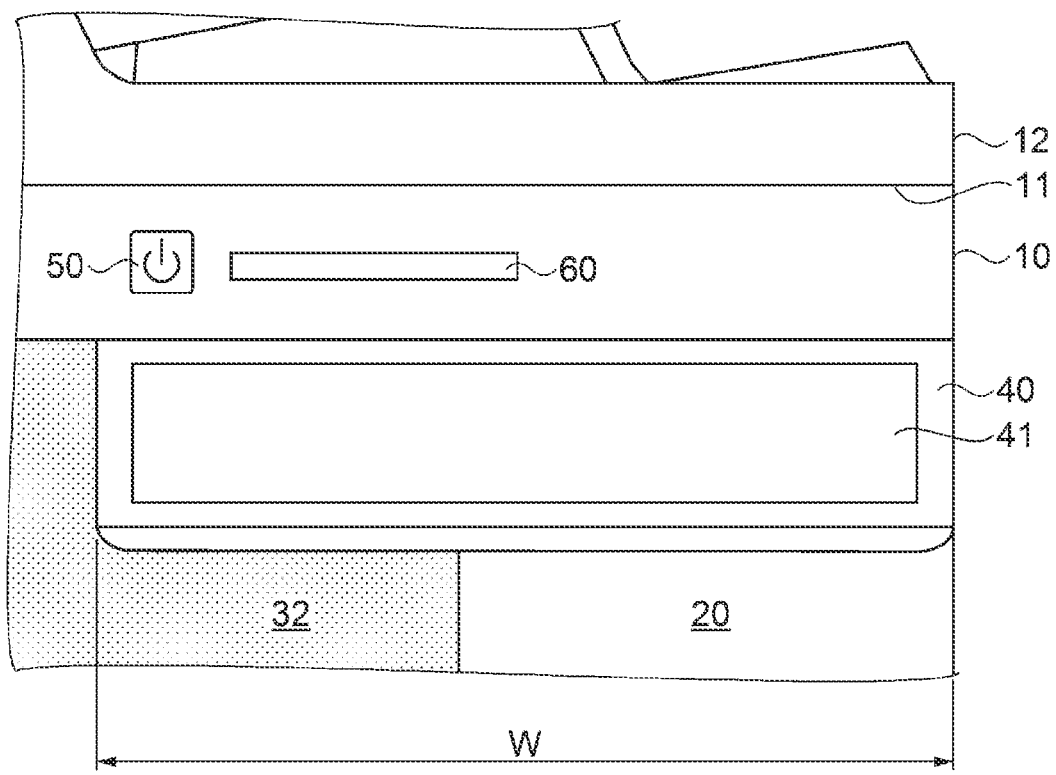
FIG. 4 is an enlarged front view of a power button and an operation unit.
Figure 4:
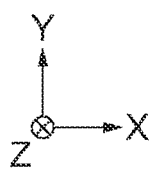

FIG. 4 is an enlarged view illustrating the operation unit 40 and the periphery of the operation unit 40. Here, a power button 50 and a identification bar 60 will be described with reference to FIG. 1, FIG. 2, and FIG. 4.

As illustrated in FIG. 1 and FIG. 2, the power button 50 that enables mains electric power supply to the image forming apparatus 1 is closer than the operation unit 40 to the rear. The power button 50 is disposed on a front portion of the image reading section 10, and more specifically, the power button 50 is provided on a front portion of the document positioning section 11 as illustrated in FIG. 2. In addition, the power button 50 is provided on the surface that intersects the operation unit 40. The power button 50 is a hardware button. The hardware button is a physical button that can be pushed, and in this embodiment, an illuminated push-button switch is used. When the switch is pushed and released, the switch is in a pushed position and a pushed state indication is illuminated. When the switch is pushed and released again, the switch returns to the initial position and the illumination is switched off. It should be noted that the push button may be any mechanical push button such as a tactile switch.

The power button 50 is disposed separately from the operation unit 40 as a separate component as illustrated in FIG. 4. The power button 50 according to the embodiment is disposed at a left end of the width W that is the long side of the operation unit 40 in the X-axis direction in front view; however, the position is not limited to this example and may be any position within the width W. The power button 50 according to the embodiment is approximately 15 mm×15 mm. The dimensions and shape are not limited to this example and may be any dimensions and shape that enable good visibility.

The identification bar 60 that has a color and extends in the X-axis direction is disposed adjacent to the power button 50 of the image forming apparatus 1 as illustrated in FIG. 1. The identification bar 60 according to the embodiment is a strip-shaped section having a length of approximately 8 mm and extends toward the right side of the power button 50 as illustrated in FIG. 4. In this embodiment, the width of the identification bar 60 is approximately half the width W of the operation unit 40 from a side of the power button 50. The width is not limited to this example and may be any width that enables good identification, such as a quarter or more of the width W.

The identification bar 60 according to the embodiment is a blue plate-shaped sheet member that differs in color from the apparatus body, that is covered by a thickly applied transparent resin, and on which an emblem is displayed. The identification bar 60 is a wide, refreshing blue bar that shows that an ink jet print unit is mounted. The plate may be any plate of refreshing blue such as a metal plate subjected to metal plating. In addition, the plate may have a metallic color such as metallic blue. The identification bar 60 may be disposed to the left of the power button 50.

As described above, the image forming apparatus 1 according to the embodiment has the following advantages. The image forming apparatus 1 includes the image reading section 10 that reads a document mounted on the document positioning section 11, the document pressing cover 12 that is disposed on the image reading section 10 and opened or closed, the image forming section 20 that forms an image read by the image reading section 10 on a sheet, the discharge section 30 that discharges the sheet on which the image is formed by the image forming section 20, the discharge tray 31 that receives the sheet from the discharge section 30, and the operation unit 40 that includes at least the touch panel 41. The power button 50, which is a hardware button, is provided on the front portion of the image reading section 10 that is closer than the operation unit 40 to the rear.

The structure includes the operation unit 40 and the power button 50 disposed separately. The structure differs from known structures in which the variety of operation buttons including the power button 50 are disposed in the operation unit 40. Accordingly, erroneous user operations can be prevented; for example, the user can be prevented from unintentionally operating the power button 50 in the course of operation. In addition, since the power button 50 is disposed separately from the operation unit 40, the position of the power button 50 is readily identifiable. Accordingly, the image forming apparatus 1 that enables the user to readily identify the position of the power button 50 and that is capable of preventing the user from erroneously operating the power button 50 can be provided.

The image forming apparatus 1 has the internal discharge section 32 that is defined between the image reading section 10 and the image forming section 20 in the up-down direction, and the discharge tray 31 is disposed in the internal discharge section 32. The internal discharge section 32 has the opening on the front portion of the image forming apparatus 1, and at least part of the operation unit 40 overlaps part of the internal discharge section 32 in front view. The internal discharge section 32 is large enough for the user to remove a printed sheet from the discharge tray 31. With this structure, the operation unit 40 that overlaps part of the internal discharge section 32 causes no functional problems, and such overlapping enables the image forming apparatus 1 to be provided in a compact form.

The power button 50 is disposed within the width W of the operation unit 40. With this structure, the operation unit 40 and the power button 50 that are disposed in the front-back direction enable the user to readily identify the position of the power button 50.

The dark color of the internal discharge section 32 enables the user to distinguish a white sheet and to readily identify a printed product, thereby providing good usability.

The tiltable operation unit 40 enables the user to tilt the operation unit 40 to an angle convenient for operation, thereby providing good operability.

The identification bar 60 different in color from the apparatus body and disposed adjacent to the power button 50 enables the user to readily identify the power button 50.

The identification bar 60 that extends toward the right side of the power button 50 enables the user to identify the power button 50 more readily. In addition, the identification bar 60 that is a characteristic refreshing blue is appealing and emphasizes that the ink jet print unit is mounted.

The image forming apparatus 1 includes the internal discharge section 32 disposed on the left and the operation unit 40 disposed on the right in front view, which enables the user to readily operate the operation unit 40.

The image forming section 20 includes the print unit that includes the ink jet head. With this structure, the ink jet image forming apparatus 1 that enables the user to readily identify the position of the power button 50 and that is capable of preventing the user from erroneously operating the power button 50 can be provided.

Second Embodiment

Power Button and Identification Bar According to Another Embodiment

Figure 5:
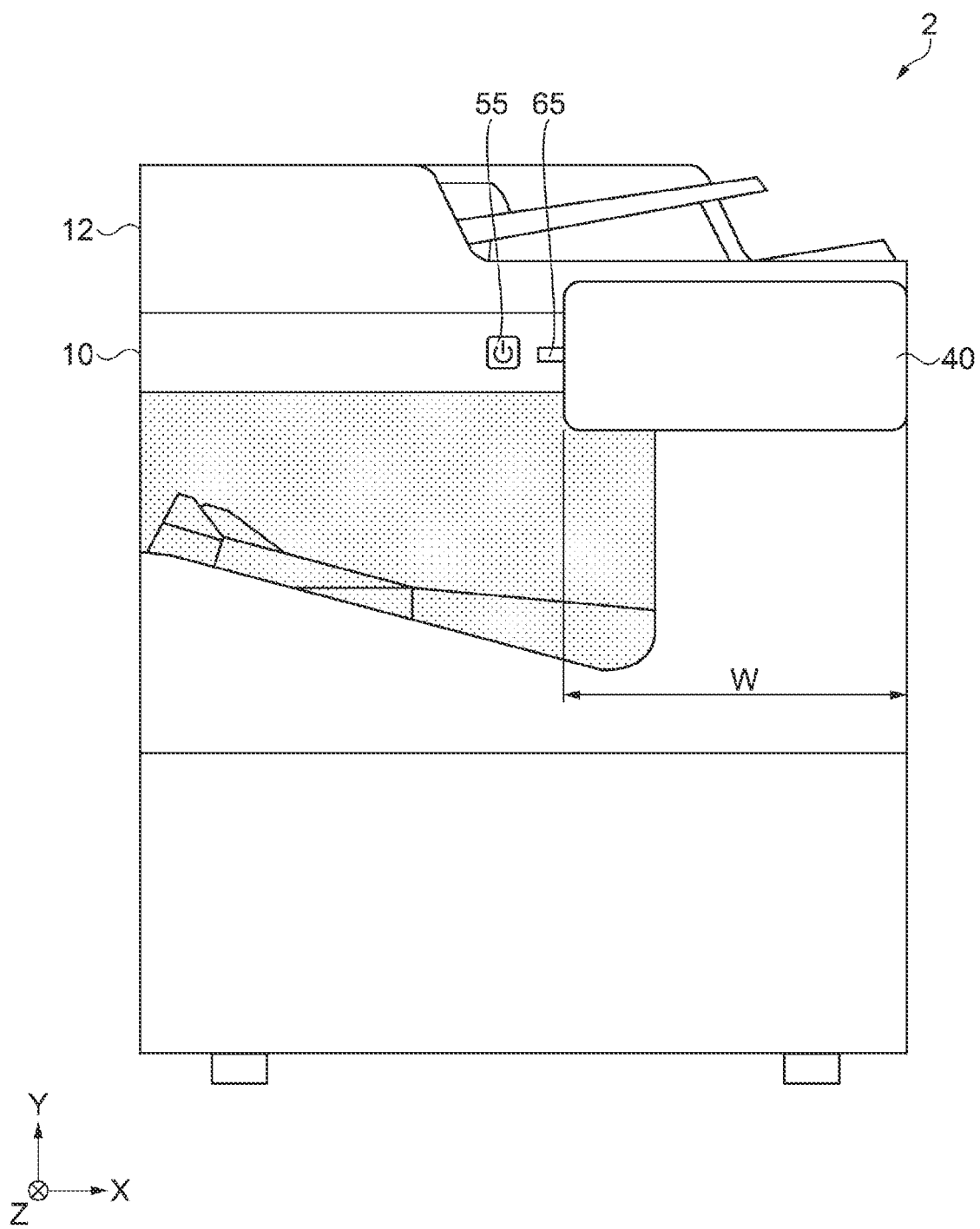
FIG. 5 is a front view illustrating an image forming apparatus according to a second embodiment in which an operation unit is maximally tilted.

FIG. 5 is a front view illustrating an image forming apparatus in which an operation unit is maximally tilted, and the view corresponds to FIG. 1. An image forming apparatus 2 according to the embodiment illustrated in FIG. 5 includes a power button 55 and a identification bar 65 whose positions differ from those of the power button 50 and the identification bar 60 according to the first embodiment. More specifically, in a state in which the operation unit 40 is maximally tilted from the apparatus front toward the rear, the power button 55 is shifted to the left so as to not overlap the operation unit 40.

Hereinafter, components similar to those in the first embodiment are given the same reference numerals, and descriptions similar to those in the first embodiment are omitted.

As described above, the operation unit 40 can be tilted from the front toward the rear about an end on the image reading section 10 side. FIG. 5 illustrates the operation unit 40 that is maximally tilted from the apparatus front toward the rear. Such a state is applicable when moving the image forming apparatus 2 to a new installation location. The power button 55 in front view is disposed so as to not overlap the operation unit 40 that is maximally tilted from the front toward the rear. More specifically, the power button 55 is disposed to the left of the operation unit 40 on the front of the image reading section 10. With this structure, the image forming apparatus 2 according to the embodiment enables the user to operate the power button 55 when the operation unit 40 is maximally tilted from the apparatus front toward the rear.

As illustrated in FIG. 5, the identification bar 65 extends toward the right side of the power button 55. In front view, part of the identification bar 65 according to the embodiment protrudes from the left side of the operation unit 40 with respect to the width W when the operation unit 40 is maximally tilted. With this structure, the identification bar 65 enables the user to readily identify the position of the power button 55 when the operation unit 40 is maximally tilted.

As described above, the image forming apparatus 2 according to the embodiment has the following advantages.

The image forming apparatus 2 includes the power button 55 that is disposed so as to not overlap the operation unit 40 when the operation unit 40 is maximally tilted from the apparatus front toward the rear. With this structure, for example, when the image forming apparatus 2 is moved in a state in which the operation unit 40 is maximally tilted, even if the user forgets to turn off the power, the power button 55 can be operated.

Third Embodiment

Identification Bar According to Another Embodiment

Figure 6:
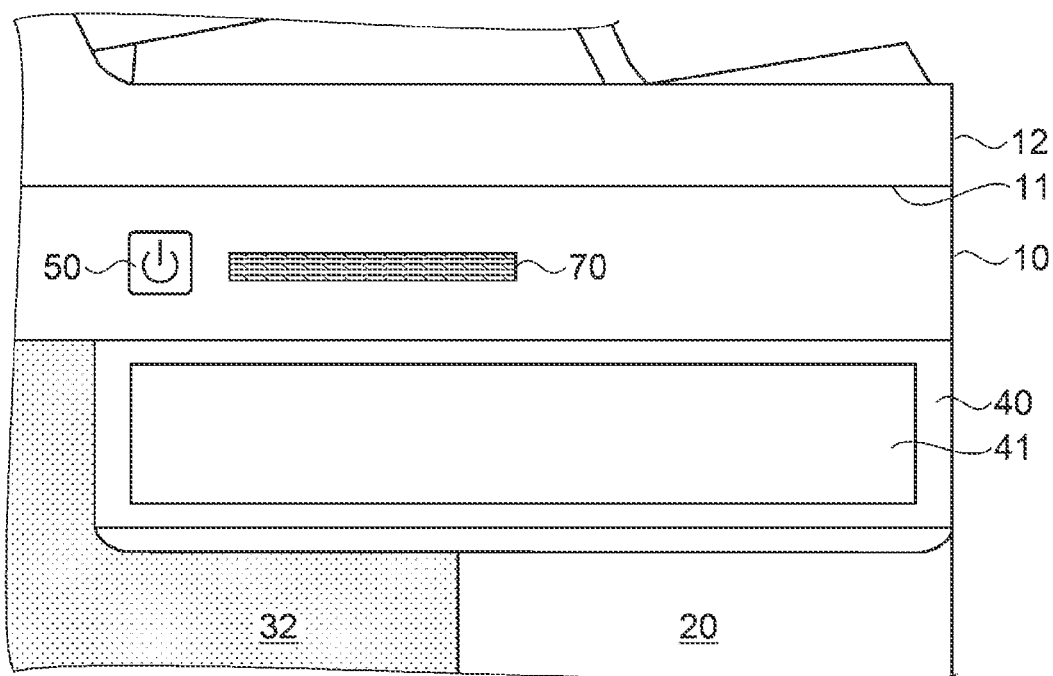
FIG. 6 is an enlarged front view illustrating an identification bar according to a third embodiment that is a light-emitting diode (LED).

FIG. 6 is an enlarged front view of a power button and an operation unit according to the embodiment, and the view corresponds to FIG. 4. A identification bar 70 according to the embodiment illustrated in FIG. 6 differs from the identification bar 60 in the first embodiment; more specifically, the identification bar 70 is an LED. Hereinafter, the same reference numerals are given to components similar to those in the first embodiment, and descriptions similar to those in the first embodiment are omitted.

The identification bar 70 is an LED that extends in the X-axis direction on a front portion of the image reading section 10. The identification bar 70 extends toward the right side of the power button 50, and the extension width and the length are similar to those of the identification bar 60 according to the first embodiment. The identification bar 70 is blue when in an off state and is a brighter blue when in an on state. The identification bar 70 is in an on state while the image reading section 10 is operating and is in an off state when the power is off. The identification bar 70 may function as an indicator that indicates, by its lighting state, an operation status of the image forming apparatus 1. For example, the identification bar 70 when green may denote a normal state, and the identification bar 70 when red may denote an abnormal state. In another example, the identification bar 70 when blinking orange may denote a normal data communication transmission state. The identification bar 70 when orange may denote a communication error or a sheet jam. In addition, the identification bar 70 may include two or more LEDs. In such a case, the LEDs may be disposed to the right and left of the power button or the LEDs may be disposed side by side.

As described above, the image forming apparatus 1 according to the embodiment has the following advantages. The lighting state of the LED of the identification bar 70 enables the identification bar 70 to indicate that the ink jet print unit is mounted or to indicate an operation status.

Fourth Embodiment

Image Forming Section According to Another Embodiment

Returning to FIG. 1, in the above-described embodiments, the image forming apparatus 1 includes the print unit that includes the ink jet head; however, the structure is not limited to this example. For example, the image forming apparatus 1 may include an electro-photographic print unit. More specifically, the image forming section in the image forming apparatus 1 may include an exposure unit, a development device, a photosensitive drum, a charger, a transfer roller, a fixing unit, or the like (not illustrated). With this structure, effects similar to those in the above-described embodiments are also achievable. In addition, in general, because the startup time of electro-photographic image forming apparatuses is longer than that of ink jet image forming apparatuses, if the power is erroneously switched off, a considerably long time to reboot the apparatus is required. Accordingly, preventing erroneous operation is effective.

What is claimed is:

1. An image forming apparatus comprising:
   an image reading section configured to read a document mounted on a document positioning section;
   a document pressing cover configured to be opened or closed, the pressing cover being disposed on the image reading section;
   an image forming section configured to form an image on a sheet;
   a discharge section configured to discharge the sheet on which the image is formed by the image forming section;
   a discharge tray configured to receive the sheet from the discharge section;
   an operation unit including at least a touch panel display;
   a power button that is a hardware button is provided on a front portion of the image forming apparatus; and
   an identification bar disposed adjacent to the power button and configured to identify a location of the power button and identify an operational status of the image forming apparatus from a plurality of operational statuses, the identification bar identifying three or more operational statuses selected from an off state, an on state, a normal state, an abnormal state, a normal data communication transmission state, a communication error, and a sheet jam state.

2. The image forming apparatus according to claim 1, wherein the power button is disposed within a width of the operation unit.

3. The image forming apparatus according to claim 1, wherein an internal discharge section is defined between the image reading section and the image forming section in an up-down direction, and the discharge tray is disposed in the internal discharge section,
   the internal discharge section has an opening on a front portion of the image forming apparatus, and
   in front view, at least part of the operation unit overlaps part of the internal discharge section.

4. The image forming apparatus according to claim 3, wherein the internal discharge section is a dark color.

5. The image forming apparatus according to claim 3, wherein in front view, the internal discharge section is disposed on a left side and the operation unit is disposed on a right side.

6. The image forming apparatus according to claim 1, wherein in a state in which the operation unit is maximally tilted from the apparatus front toward the rear, the power button does not overlap the operation unit.

7. The image forming apparatus according to claim 1, wherein the identification bar is different in color to an apparatus body.

8. The image forming apparatus according to claim 7, wherein the identification bar is a light-emitting diode (LED).

9. The image forming apparatus according to claim 7, wherein the identification bar extends toward a right side of the power button.

10. The image forming apparatus according to claim 1, wherein the image forming section includes a print unit that includes an ink jet head.

11. An image forming apparatus comprising:
an image reading section configured to read a document mounted on a document positioning section;
a document pressing cover configured to be opened or closed, the pressing cover being disposed on the image reading section;
an image forming section configured to form an image on a sheet;
a discharge section configured to discharge the sheet on which the image is formed by the image forming section;
a discharge tray configured to receive the sheet from the discharge section;
an operation unit including at least a touch panel display;
a power button that is a hardware button is provided on a front portion of the image forming apparatus; and
an identification bar disposed adjacent to the power button and configured to identify a location of the power button and identify an operational status of the image forming apparatus from a plurality of operational statuses, the identification bar identifying three or more operational statuses selected from an off state, an on state, a normal state, an abnormal state, a normal data communication transmission state, a communication error, and a sheet jam state.

12. The image forming apparatus according to claim 11, wherein the power button is disposed within a width of the operation unit.

13. The image forming apparatus according to claim 11, wherein
an internal discharge section is defined between the image reading section and the image forming section in an up-down direction, and the discharge tray is disposed in the internal discharge section,
the internal discharge section has an opening on a front portion of the image forming apparatus, and
in front view, at least part of the operation unit overlaps part of the internal discharge section.

14. The image forming apparatus according to claim 13, wherein the internal discharge section is a dark color.

15. The image forming apparatus according to claim 11, wherein in a state in which the operation unit is maximally tilted from the apparatus front toward the rear, the power button does not overlap the operation unit.

16. The image forming apparatus according to claim 11, wherein the identification bar is different in color to an apparatus body.

17. The image forming apparatus according to claim 16, wherein the identification bar is a light-emitting diode (LED).

18. The image forming apparatus according to claim 16, wherein the identification bar extends toward a right side of the power button.

19. An image forming apparatus comprising:
an image reading section configured to read a document mounted on a document positioning section;
a document pressing cover configured to be opened or closed, the pressing cover being disposed on the image reading section;
an image forming section configured to form an image on a sheet;
a discharge section configured to discharge the sheet on which the image is formed by the image forming section;
a discharge tray configured to receive the sheet from the discharge section; and
an operation unit including at least a touch panel display;
a power button that is a hardware button is provided on a back side of the operation unit and on a front portion of the image reading section, the power button extending from a face of the front portion, the face being angularly orientated in relation to a sheet receiving portion of the document positioning section; and
an identification bar disposed adjacent to the power button and configured to identify a location of the power button and identify an operational status of the image forming apparatus from a plurality of operational statuses, the identification bar identifying three or more operational statuses selected from an off state, an on state, a normal state, an abnormal state, a normal data communication transmission state, a communication error, and a sheet jam state.

* * * * *